US006917303B2

(12) United States Patent
Stuart-Bruges et al.

(10) Patent No.: US 6,917,303 B2
(45) Date of Patent: Jul. 12, 2005

(54) LOGGING SONDES FOR USE IN BOREHOLES

(75) Inventors: William P. Stuart-Bruges, Hampshire (GB); Andrew P. Bridges, Hampshire (GB)

(73) Assignee: Sondex Limited, Hampshire (GB)

( * ) Notice: Subject to any disclaimer, the term of this patent is extended or adjusted under 35 U.S.C. 154(b) by 449 days.

(21) Appl. No.: 10/258,563

(22) PCT Filed: Apr. 27, 2001

(86) PCT No.: PCT/GB01/01868

§ 371 (c)(1),
(2), (4) Date: Oct. 24, 2002

(87) PCT Pub. No.: WO01/83948

PCT Pub. Date: Nov. 8, 2001

(65) Prior Publication Data

US 2003/0141988 A1 Jul. 31, 2003

(30) Foreign Application Priority Data

Apr. 28, 2000 (GB) .............................. 0010449

(51) Int. Cl.⁷ ................................................ G01V 3/00
(52) U.S. Cl. ........................ 340/854.6; 702/6; 702/7; 702/61; 324/333; 324/338; 250/268; 250/299.1; 195/50
(58) Field of Search .................. 702/6, 7, 11; 324/329, 324/333, 338, 339; 250/268, 269.1; 175/50; 340/854.6, 854.8

(56) References Cited

U.S. PATENT DOCUMENTS

| | | | |
|---|---|---|---|
| 4,588,951 A | | 5/1986 | Ohmer |
| 4,597,183 A | * | 7/1986 | Broding ........................ 33/701 |
| 5,008,664 A | | 4/1991 | More et al. |
| 5,160,925 A | | 11/1992 | Dailey et al. |
| 5,457,988 A | | 10/1995 | Delatorre |
| 5,491,488 A | | 2/1996 | Wu |
| 6,028,534 A | | 2/2000 | Ciglenec et al. |
| 6,061,000 A | * | 5/2000 | Edwards .................. 340/854.6 |
| 6,684,952 B2 | * | 2/2004 | Brockman et al. ..... 166/250.03 |
| 6,768,700 B2 | * | 7/2004 | Veneruso et al. ............. 367/81 |
| 6,856,255 B2 | * | 2/2005 | Chalitsios et al. ........ 340/854.4 |

FOREIGN PATENT DOCUMENTS

EP 0 285 473 10/1988

* cited by examiner

Primary Examiner—Albert K. Wong
(74) Attorney, Agent, or Firm—Flynn, Thiel, Boutell & Tanis, P.C.

(57) ABSTRACT

A wireline logging sonde for sensing fluid properties in a bore hole. The sonde has a main body and a plurality of sensor capsules mounted peripherally to the main body on fingers. A sensor element is located in each sensor capsule. The sensor elements receive power by inductive coupling from the main body and transmit data signals at radio frequencies back to the main body.

9 Claims, 4 Drawing Sheets

LOGGING SONDES FOR USE IN BOREHOLES

BACKGROUND OF THE INVENTION

This invention relates to wireline logging sondes and to methods of using a logging sonde in a borehole.

It is often necessary to determine parameters such as fluid properties or casing condition or to undertake formation logging in a borehole such as an oilwell borehole. For such purposes a logging sonde is employed which is lowered down the borehole and which has sensors for the required parameter e.g. fluid property or properties. The properties may, for example, include flow rate, dielectric constant, capacitance, resistivity, temperature, thermal capacity, or pH value. It may be required to establish the fluid properties at many points across the borehole, and this is particularly the case with slanting (non-vertical) or horizontal parts of a borehole. Typically therefore a plurality of sensors are employed at different positions across the borehole.

In a borehole three 'phases' can be present, namely water, oil and gas. Also, the ambient pressures and temperatures can be extremely high. The individual sensors are contained in pressure-proof capsules. It is necessary to provide electrical connections between the sensors and a telemetry cartridge in the sonde which is connected by wire to the surface. The electrical wires which provide these connections between the sensors and the telemetry cartridge require high pressure seals at the sensors and at the cartridge. These seals are difficult to manufacture and are subject to failure.

U.S. Pat. No. 5,457,988 describes pressure measuring system which uses inductive coupling to connect a downhole well tool to a cable. The cable carries DC to an oscillator adjacent the well tool which inductively transmits power to the tool. Pressure sensors in the tool develop frequency shifted signals to the cable via the inductive coils which provide a digital current modulation which is detected at the earth's surface. The inductive cable connection is essentially a transformer requiring the windings to be located in very close proximity to each other and sharing a common magnetic core. The air gap between the two windings is reduced to the sort of dimension commonly found in conventional signal transformers.

U.S. Pat. No. 4,588,951 describes a mechanical arrangement for urging a measuring pad into engagement in the wall of a borehole. European Patent Application EP-A-0 285 473 describes a mechanical arrangement for increasing the angular field of a logging sonde, and also uses pads.

SUMMARY OF THE INVENTION

We have appreciated that electrical connecting wires between the sensors and a telemetry cartridge in the sonde can be completely eliminated, thereby avoiding the need for high pressure seals altogether.

The invention in its various aspects is defined in the appended claims to which reference should now be made. Advantageous features are set forth in the appendant claims.

A preferred embodiment of the invention is described in more detail below with reference to the drawings and takes the form of a wireline logging sonde for sensing fluid properties in a borehole which has a main body and a plurality of sensor capsules mounted peripherally of the main body on fingers. The sensor capsules transmit data signals at radio frequency to the main body, and are powered from the main body by inductive coupling. The need to provide pressure-proof wire connections between the main body and into the sensor capsules is thus completely avoided. The device can be used with the sensor capsules spaced out across the borehole and not necessarily adjacent the main body.

BRIEF DESCRIPTION OF THE DRAWINGS

The invention will now be described in more detail, by way of example, with reference to the drawings, in which.

DETAILED DESCRIPTION OF THE PREFERRED EMBODIMENT

Figure 1:
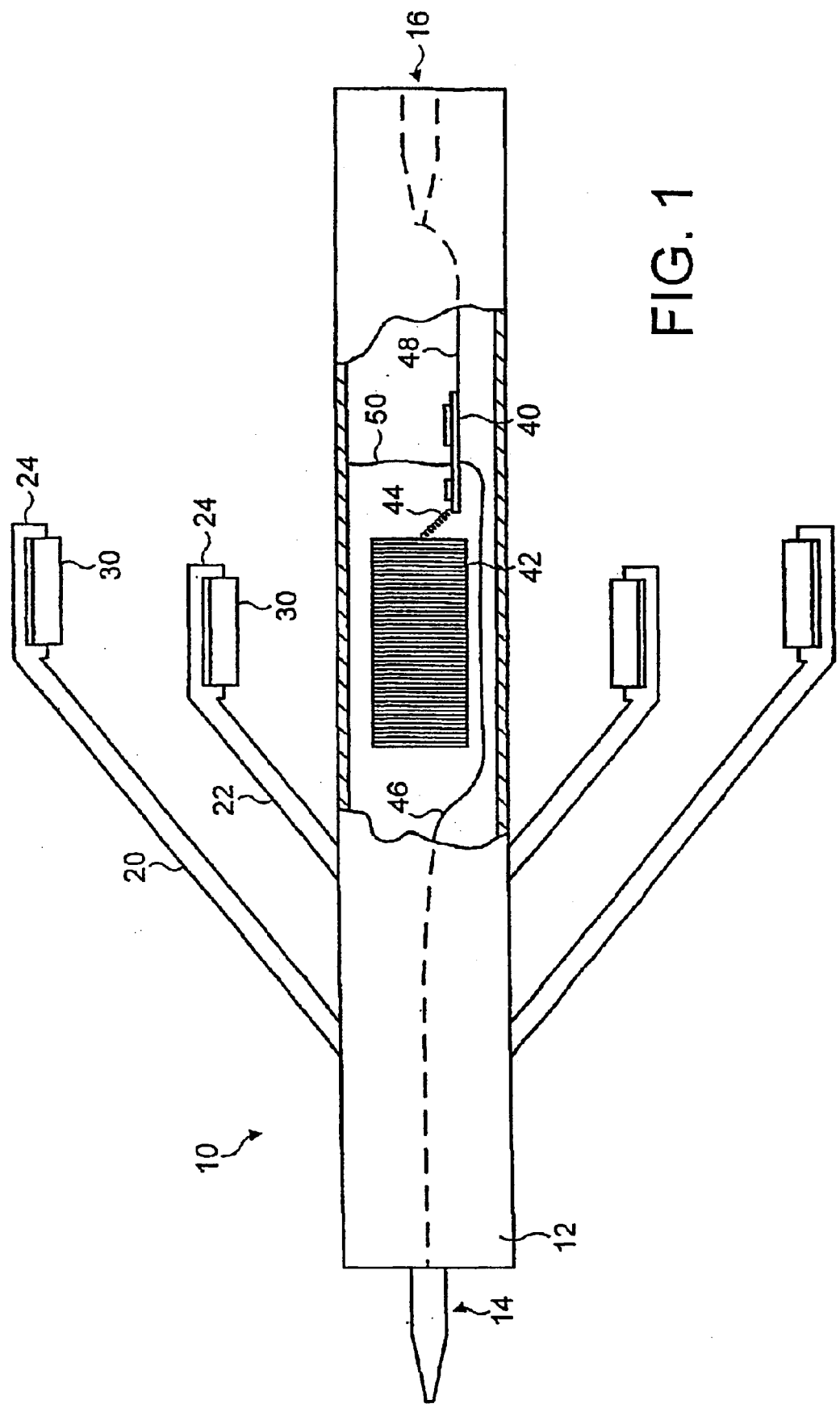
FIG. 1 is an illustrative sectional view of a logging sonde embodying the invention.

A wireline logging sonde 10 embodying the invention is illustrated in FIG. 1. The sonde 10 is cylindrical in overall shape and is about 500 mm in length and 40 mm in diameter. Each end of the sonde housing 12 includes means 14, 16 for mechanically and electrically coupling to other sondes to form a string, in conventional fashion. The string is connected to the surface by a wireline (not shown) which provides both mechanical connection and electrical connection using a single conductor and an earth path. The earth path may be provided by a conductive screen to the wireline or by the borehole lining, for example.

The sonde has a plurality of sprung extending fingers 20 and 22 shown in the extended positions. These are arranged all around the periphery of the sonde. In the example shown the fingers 20 provide an outer ring of sensor locations and the fingers 22 provide an inner ring of sensor locations. Each finger has a sensor mounting formation 24 at its free end. Each finger is mounted on the housing 12 by any convenient sprung pivot arrangement.

At the sensor mounting location 24 of each of the fingers 20,22 a sensor capsule 30 is received. This is cylindrical is shape and is about 10–12 mm long and about 2 mm in diameter.

Within the housing 12 at the section shown broken away in FIG. 1 are the active components of the telemetry cartridge. This comprise a circuit board 40 and a coil 42. The coil is wound on the main axis of the sonde 10 and is electrically connected by conductors 44 to the circuit board 40. The circuit board is also connected by conductors 46,48,50 to the end connectors 14,16 of the sonde and to the housing 12 which provides the electrical earth (ground) connection to the wellhead.

Figure 2:
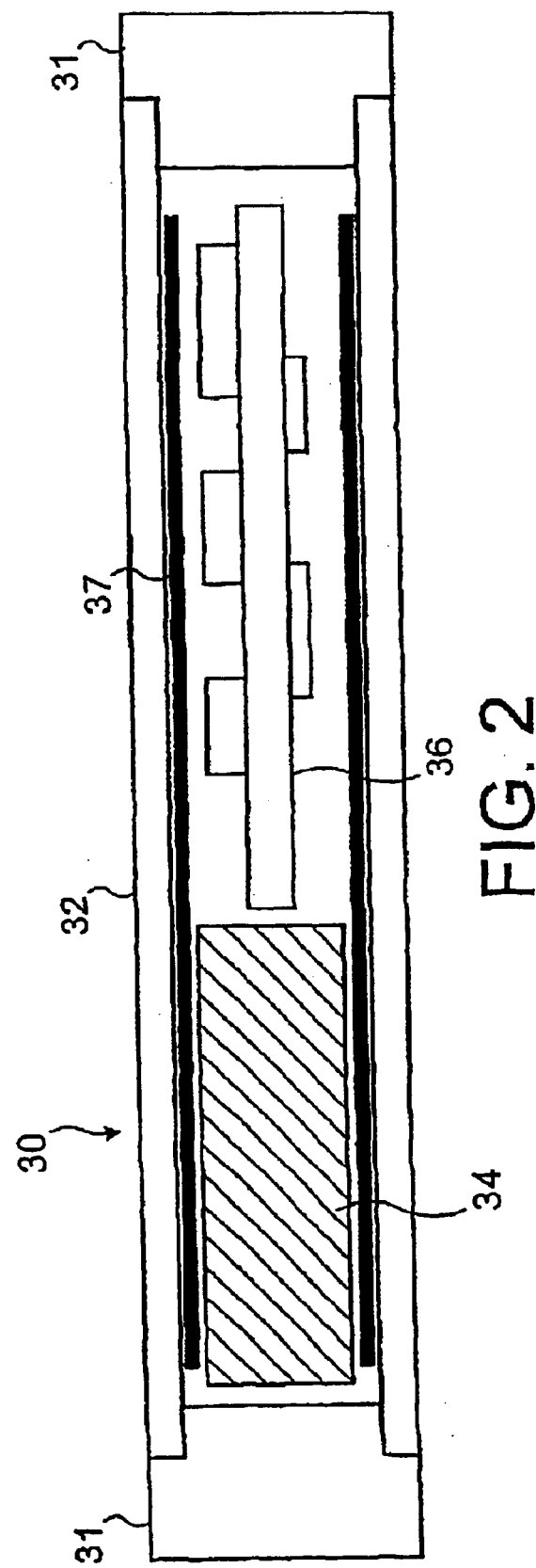
FIG. 2 is an enlarged sectional view of one of the sensors of the logging sonde of FIG. 1.

The sensor capsule 30 is shown in section in FIG. 2. It is constructed of a housing 32 which provides pressure and temperature resistance and may be made for example from ceramic, quartz, glass, or metal of low magnetic permeability and relatively low electrical conductance. The ceramic tube 32 is fitted with end caps 31, which are preferably of metal bonded to the tube 32. The use of metal permits the fitting of an earth reference connection through the arms 20,22, and also of a sealed thin-wall tube containing a temperature probe (not shown). The housing 32 contains a coil 34 wound on a ferrite core and a printed circuit board 36, as described in more detail below, as well as a sensor. As an example of a sensor a metal capacitance probe 37 is shown.

The electrical connections and the manner in which the system operates will now be described with reference to the schematic diagrams of FIGS. 3 and 4, which show the printed circuit 40 in the telemetry cartridge and the printed circuit 36 in the sensor capsule respectively.

Figure 3:
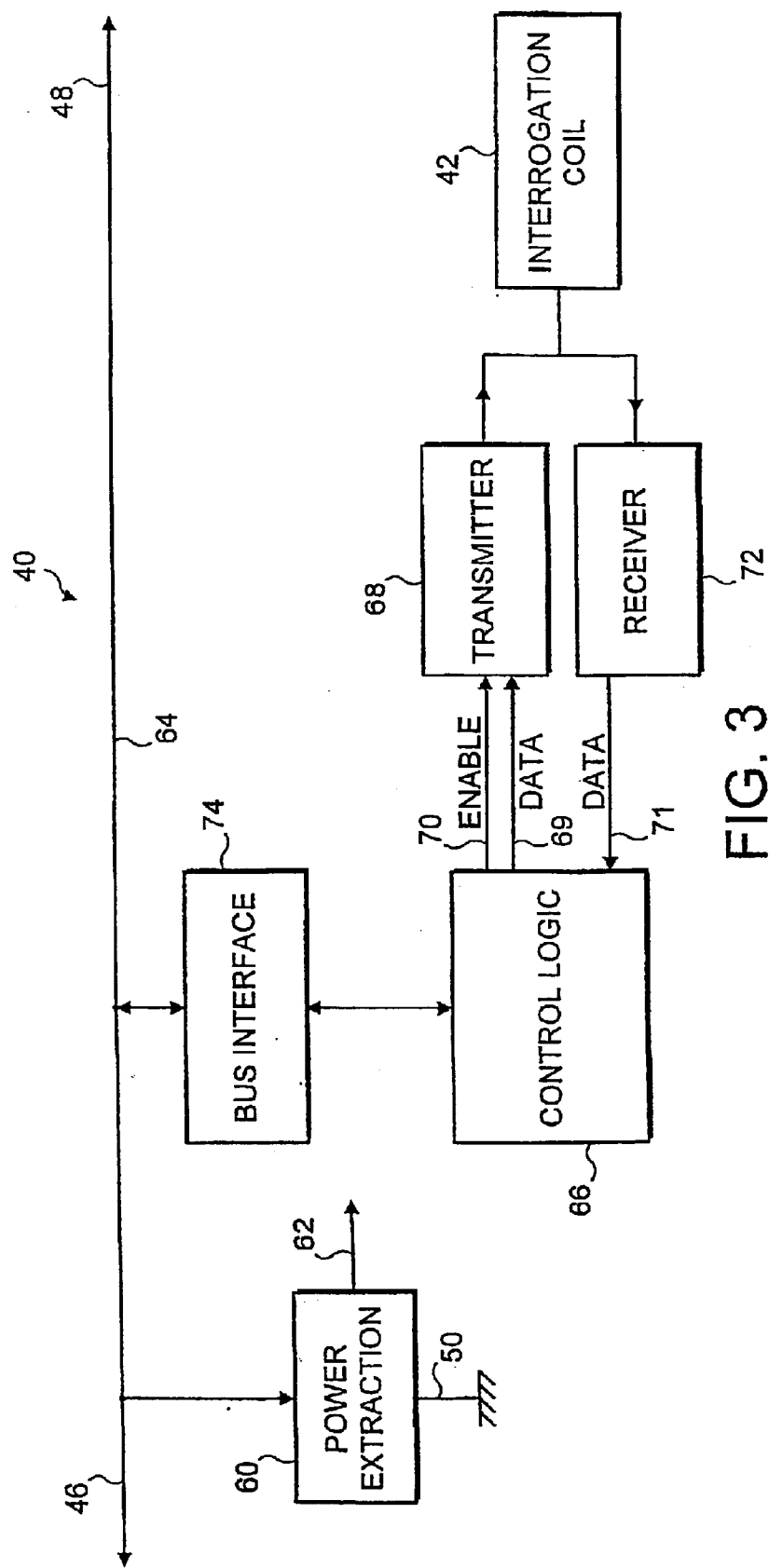
FIG. 3 is a schematic wiring diagram of the telemetry cartridge in the logging sonde of FIG. 1.

As shown in FIG. 3, the printed circuit 40 has a connection 50 to the earth path, a connection 46 to the preceding sonde in the string, and a connection 48 to the succeeding sonde in the string. A power extraction circuit 60 is connected to the connections 46 and 50 and provides power for the rest of the printed circuit 40 over a line 62.

Between the connections 46,48 is a bus 64 providing connection to the telemetry system. A bus interface 74 provides two-way communication between the bus 64 and control logic 66. The control logic has two outputs connected to a transmitter 68, the first being a data output 69 and the second an enable or control output 70. The control logic 66 also receives at an input 71 data from a receiver 72. The output of the transmitter 68 and the input of the receiver 72 are both coupled to the interrogation coil 42. Transmission and reception are conveniently at the same frequency and typically take place at radio frequencies in the frequency range above 20 kHz and up to 200 kHz or even 1 MHZ.

Figure 4:
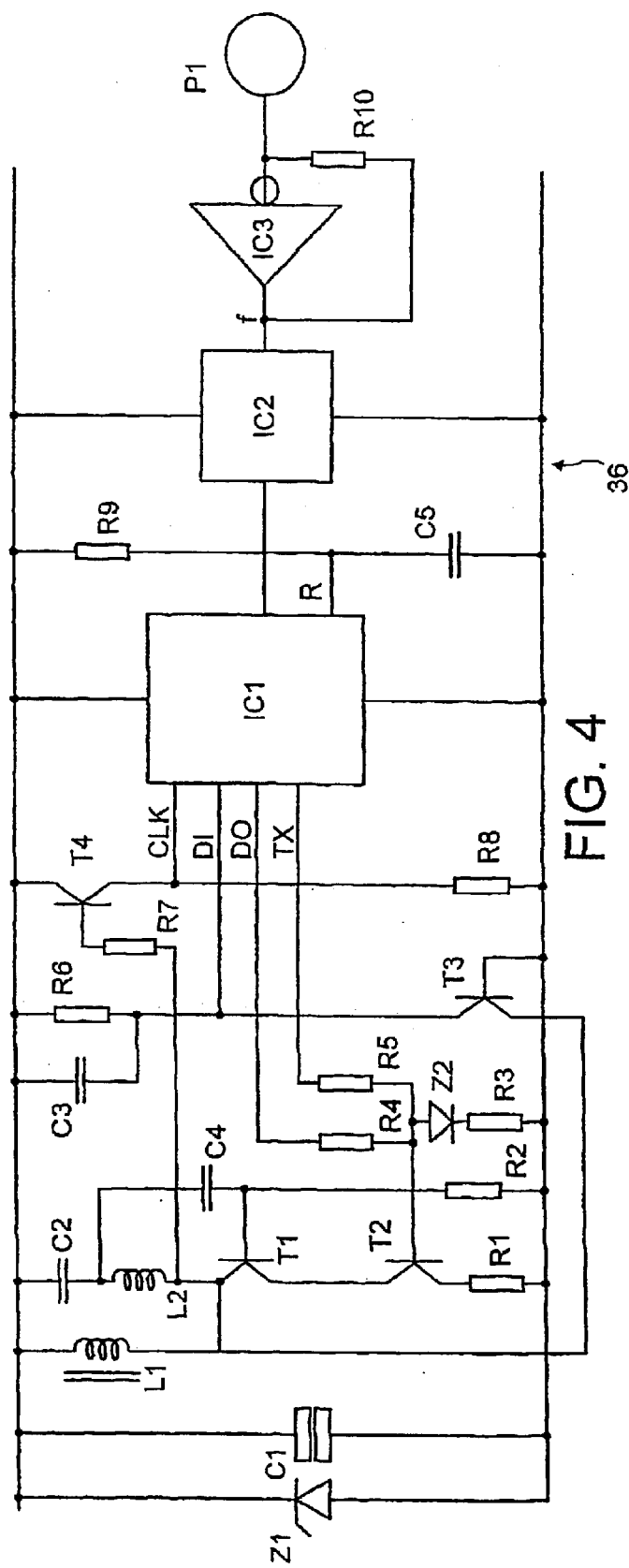
FIG. 4 is a schematic wiring diagram of one of the sensors in the logging sonde of FIG. 1.

The electrical construction of the circuit board 36 in the sensor capsule 30 is illustrated in FIG. 4. In this example the transponder is a capacitance measuring probe. An inductor L1 acts as an aerial or antenna and corresponds to the coil 34 in FIG. 2. The inductor L1 receives a semi-continuous signal by inductive coupling from the interrogation coil 42 in the sonde housing 12. This signal is used first of all to power the probe, and to this end is supplied to transistor T3 where it is rectified by the base diode junction. A capacitor C1 acts as a reservoir, and a zener diode Z1 regulates the voltage.

Transistor T3, in conjunction with resistor R6 and capacitor C3, also acts as a peak envelope detector to demodulate the transmitted binary coded data, and provide a data input signal D1 to a microprocessor IC1. A transistor T4 forms a zero-crossing detector to convert the received carrier waveform, whatever its amplitude, into a clock signal CLK for the microprocessor IC1. A transistor T2, together with resistors R3, R4 and R5, allows the microprocessor IC1 to supply is two levels of current to a transistor T1, which, with inductor L1, an inductor L2, and capacitors C2 and C4, forms an oscillator for transmitting data to the interrogator coil 42 via the inductor L1.

A cylindrical antenna P1 forms the sensor element of the capacitance probe. The antenna P1 is not a complete cylinder so that it does not constitute a shorted turn, which would adversely affect the operation of inductor L1. The part-cylindrical antenna P1 is coupled to a high impedance Schmidt inverter circuit IC3 with a feedback resistor R10. This then oscillates at a high frequency which depends on the capacitance to ground via the dielectric surrounding the probe. The high frequency output of the circuit IC3 is then scaled by a divider IC2 to a lower frequency level, and microprocessor IC1 accumulates the count for regular interrogation by the telemetry cartridge. The count is regularly reset under the control of a reset signal R provided by a capacitor C5 and resistor R9.

The operation of the system will now be described in more detail.

In the sonde housing 12 the power extraction circuit 60 continuously extracts power from the wireline. The transmitter 68 is selectively enabled by the control logic 66 and when enabled transmits a data-containing signal. The coils 34 or L1 at each of the sensor capsules pick up the high frequency power, which is extracted and converted to 5 volts dc for use by the components on the circuit board 36.

Periodically, the control logic circuit 66 starts a measurement cycle. This measurement cycle involves interrogating each of the sensor capsules in turn. The control logic 66 generates a digital interrogation signal for each sensor capsule. This includes a predefined header followed by an address code for one of the individual sensor capsules.

Having transmitted an interrogation signal for a first sensor capsule, the control logic 66 then disables the transmitter 68 for a defined period during which it expects a response from the particular sensor capsule. This response is received by receiver 72 and transmitted to the control logic 66 and thence via the bus interface 74 to the wireline and thus to the wellhead. After the defined period, the control logic 66 then interrogates the next sensor capsule 30, and so on until all the sensor capsules have been interrogated in time division multiplexed manner. The duration of the power, transmit, and receive periods in microseconds in each cycle is best determined empirically for the particular application for which the sonde is to be used.

Each sensor capsule 30 continuously monitors the signal transmitted from the board 40. The microprocessor IC1 in the circuit 36 recognises that this particular sensor capsule is being addressed. The microprocessor IC1 includes a permanent memory register which is preloaded with an individual identification number (ID) or address which identifies that particular sensor capsule.

When the microprocessor recognises that it is being addressed, it calls up the most recent capacitance value that has been loaded into it in the form of a frequency value from the divider IC2. The value is now transmitted via the transistor T1 and inductor L1 as a digital value back to the interrogation coil 42 in the housing 12 and thence to the receiver 72 and control logic 66.

Thus the coils 42,34 operate to power the sensors via high frequency induction, using radio transmission, and also operate to interrogate the sensors by transmitting coded commands. The coil 42 further acts as a receiver when a sensor is transmitting its data. The sensor capsule operates as a transponder.

Referring to FIG. 4, the printed circuit 36 thus operates in two modes, namely receive and transmit. In receive mode, the reservoir capacitor C1 is charged up and the voltage on capacitor C5 rises so as to release the reset condition in microprocessor IC1. Amplitude modulation from the interrogation signal is presented as a data input signal D1 to the microprocessor IC1. The data input signal consists of a recognisable bitstream which includes an address. If the address matches that which has previously been written into the microprocessor's permanent memory register, then the microprocessor responds by asserting the TX signal output. This switches transistor T2 on, and provides bitwise modulation of data output signal DO. During this time the interrogator 40 in the sonde housing 12 will become passive, in the sense that transmitter 68 is off and receiver 72 is operational to receive the signals transmitted by the selected probe 30.

The length of the datastream which can be transmitted by the probe 30 is limited by the size of the power reservoir capacitor C1 and by the amount of energy which can be supplied to it while the interrogator is transmitting. However, probes will be charging whether or not they are being interrogated. That is to say, all the probes will be charging even though only one of the probes is being addressed, except for the time when any one of the probes is replying.

Thus it is possible to construct a logging sonde, with a large number of sensors, without pressure-proof wire connections between the telemetry section and each sensor. This not only reduces the risk of malfunction due to leakage, but renders the construction and maintenance of such a sonde extremely simple.

No particular orientation is required between the windings 42,34 in the main body and the sensor capsules.

The sensors can be spaced across the width of the borehole. The sonde can be used for many multi-sensor measurements, for example for:

(1) fluid sensing; e.g. flow, pressure, density, dielectric constant;
(2) sensing casing condition; calipering, magnetic flux leakage, eddy current, or ultrasonic measurement;
(3) formation logging; rock density, porosity, permeability, or dipmetering.

The power required is not great because the transmission distances are typically only around 100–300 mm.

It will be appreciated that many modifications may be made to the arrangement described. While the housing has been described as having the sensor capsules mounted on fingers, they could be mounted on spring bows. One end of each spring bow is fixed to a point on the casing and the other end can slide along the housing to move the sensor capsule it carries in and out between retracted and extended positions. In another alternative, the sensors can be embedded around the circumference of a solid cylindrical tool. While the coils 42,34 are used both for inductive power transmission and data transmission, it would be possible to have separate antennae for the data transmission. In a simplified arrangement there are no interrogation signals as such and each sensor capsule transmits periodically. Power is still power to the sensor capsules by inductive coupling.

What is claimed is:

1. A wireline logging sonde, comprising:
   a main body for mechanical and electrical connection to a wireline and having a plurality of retractable, outwardly extending fingers;
   a telemetry section housed in the main body for electrical coupling to the wireline, said telemetry section including first transmission/reception means for transmitting power and for receiving data signals; and
   a plurality of sensor devices mounted on the outwardly extending fingers peripherally of the main body, each said sensor device comprising a sensor element, and second transmission/reception means for transmitting to said first transmission/reception means data signals dependent upon the output of the sensor element and for receiving power from said first transmission/reception means by electromagnetic transmission at radio frequency.

2. The sonde according to claim 1, wherein said first and second transmission/reception means each includes a coil for transmission of power from said main body to said sensor devices.

3. The sonde according to claim 2, wherein said coils also convey the data signals.

4. The sonde according to claim 2, wherein said coils have axes substantially parallel to an axis of said main body.

5. The sonde according to claim 1, wherein said first transmission/reception means transmits interrogation signals which are received by said second transmission/reception means.

6. The sonde according to claim 5, wherein each said sensor device has an individual identification and said first transmission/reception means transmits signals to interrogate said sensor devices in sequence.

7. The sonde according to claim 1, wherein said sensor element senses at least one of capacitance, flow rate, dielectric constant, resistivity, temperature, thermal capacity, and pH value.

8. A wireline logging sonde, comprising:
   a main body for mechanical and electrical connection to a wireline;
   a telemetry section housed in the main body for electrical coupling to the wireline, said telemetry section including first transmission/reception means for transmitting power and for receiving data signals; and
   a plurality of sensor devices mounted peripherally of said main body, each said sensor device comprising a sensor element, and a second transmission/reception means for transmitting to said first transmission/reception means data signals dependent upon the output of said sensor element and for receiving power from said first transmission/reception means by electromagnetic transmission at radio frequency; and
   wherein said first transmission/reception means transmits interrogation signals which are received by said second transmission/reception means.

9. The sonde according to claim 8, wherein each said sensor device has an individual identification and said first transmission/reception means transmits signals to interrogate each of the sensor devices in sequence.

* * * * *